United States Patent
Wuth Sepulveda et al.

(10) Patent No.: US 9,547,306 B2
(45) Date of Patent: Jan. 17, 2017

(54) STATE AND CONTEXT DEPENDENT VOICE BASED INTERFACE FOR AN UNMANNED VEHICLE OR ROBOT

(71) Applicant: Speak Loud SPA, Santiago (CL)

(72) Inventors: Jorge Wuth Sepulveda, Santiago (CL); Néstor Becerra Yoma, Santiago (CL)

(73) Assignee: Speak Loud SPA, Santiago (CL)

( * ) Notice: Subject to any disclaimer, the term of this patent is extended or adjusted under 35 U.S.C. 154(b) by 158 days.

(21) Appl. No.: 14/501,322

(22) Filed: Sep. 30, 2014

(65) Prior Publication Data

US 2016/0161946 A1    Jun. 9, 2016

(51) Int. Cl.

| | |
|---|---|
| *G05D 1/00* | (2006.01) |
| *G01L 15/00* | (2006.01) |
| *G10L 15/20* | (2006.01) |
| *G10L 15/10* | (2006.01) |
| *G10L 15/22* | (2006.01) |

(52) U.S. Cl.
CPC ............ *G05D 1/0022* (2013.01); *G10L 15/10* (2013.01); *G10L 15/20* (2013.01); *G10L 2015/223* (2013.01); *Y10S 901/01* (2013.01)

(58) Field of Classification Search
CPC combination set(s) only.
See application file for complete search history.

(56) References Cited

U.S. PATENT DOCUMENTS

| | | | |
|---|---|---|---|
| 7,174,300 B2 | 2/2007 | Bush | |
| 7,774,202 B2 | 8/2010 | Spengler et al. | |
| 8,311,827 B2 | 11/2012 | Hernandez et al. | |
| 2008/0065275 A1 | 3/2008 | Vizzini | |
| 2008/0201148 A1 | 8/2008 | Desrochers | |
| 2009/0083034 A1* | 3/2009 | Hernandez et al. | G10L 15/1822 704/251 |
| 2011/0295399 A1* | 12/2011 | Plociennik | B22D 7/00 700/97 |
| 2012/0299751 A1* | 11/2012 | Verna | H04L 67/12 340/945 |
| 2015/0235540 A1* | 8/2015 | Verna | H04W 4/12 340/539.11 |

FOREIGN PATENT DOCUMENTS

| | | |
|---|---|---|
| EP | 2040250 B1 | 11/2011 |
| JP | 2013128287 A | 6/2013 |
| KR | 20110135070 A | 12/2011 |
| KR | 101330991 B1 | 11/2013 |

OTHER PUBLICATIONS

Chen, S.F., et al., *Evaluation Metrics for Language Models*, Carnegie Mellon Research Showcase @ CMU, http://www.repository.cmu.edu/compsci, 1998 (7 pages).

* cited by examiner

*Primary Examiner* — Yonel Beaulieu
(74) *Attorney, Agent, or Firm* — Hasse & Nesbitt LLC; Daniel F. Nesbitt

(57) ABSTRACT

A voice-based method to control unmanned vehicles (UV) or robots that makes use of the UV or robot state and context information to constrain the output of automatic speech recognition (ASR) language models (LM) to improve the ASR accuracy and robustness in controlled and adverse environments. The voiced interaction between the human user and the machine provides a natural human-machine interface that is easy and straightforward for the human being, and reduces users' training requirements.

14 Claims, 7 Drawing Sheets

| Moving | Hovering | Rotating | Landed |
|---|---|---|---|
| Position | Position | Angle | Position |
| Altitude | Altitude | | Coordinates |
| Coordinates | Coordinates | | |
| Relative Speed | | | |
| Absolute Speed | | | |

(a)

(b)

STATE AND CONTEXT DEPENDENT VOICE BASED INTERFACE FOR AN UNMANNED VEHICLE OR ROBOT

BACKGROUND OF THE INVENTION

Providing human-machine control information to unmanned vehicles (UVs) or robots is typically unnatural and too cumbersome depending on the situation or type of user input interface (for example, joystick, keyboard, switches, etc.). Also, specific training is usually required. In recent years, voice based human-machine interface technologies to control UVs and robots have shown significant progress, despite the fact that some solutions are still naive.

In a traditional voice controlled UV or robot, the system utilizes automatic speech recognition (ASR) to recognize voice commands uttered by the human operator and to generate the corresponding machine command. The corresponding machine command is generated by the steps of receiving the recognized voice command, interpreting the voice command, and generating a control signal or machine command suitable for transmission to the remotely UV or robot. In most voice-controlled UVs or robots, ASR is employed as a "black box" that receives a speech signal and delivers the recognized text string with little concern on the potentials for error or for limitations of the ASR technology. Some innovations include the use of special microphones to reduce the effect of noise, noise cancelling methods, and natural language post-processing. However, the integration of ASR technology to the UV or robot technology and operation has been minimally explored and implemented.

In JP Publication 2013-128287, entitled WIRELESSLY CONTROLLING UNMANNED AIRCRAFT AND ACCESSING ASSOCIATED SURVEILLANCE DATA, the control of "an unmanned aerial vehicle (UAV) may be accomplished by using a wireless device (e.g., cell phone) to send a control message to a receiver at the UAV via a wireless telecommunication network (e.g., an existing cellular network configured solely for mobile telephone communication). In addition, the wireless device may be used to receive communications from a transmitter at the UAV, where the wireless device receives the communications from the transmitter via the wireless network. Examples of such communications include surveillance information and UAV monitoring information."

In Korean patent publication KR101330991, entitled VOICE RELAY SYSTEM FOR UNMANNED AERIAL VEHICLE USING PTT SIGNAL, a voice relay system for an unmanned aircraft using PTT signals is proposed. This invention relays voice communication between a wireless controller and an aircontrol center through an unmanned aircraft and receives the voice of a pilot.

In Korean patent publication KR20110135070, entitled VOICE CONTROL COMMUNICATION SYSTEM AND METHOD OF UNMANNED AERIAL VEHICLE FOR ANTICOLLISION AND DISTINGUISH POSITION, "a voice ground control system and method thereof for UAV anti-collision and positioning are provided to easily receive an aviation instruction to control of a controller by performing communication between an ACC and a UAV". "AGC (Ground Control) voice communication system includes a GC voice input device for converting the voice of UAV (Unmanned Aerial Vehicle) pilot into an analog voice signal, AGC electric wave generating/recovery device and a GC transceiver for transceiving the UAV. A UV voice communication system includes a UAV electric wave generating/restoring apparatus, a frequency control device, and a UAV transceiver. An ACC (Air Control Center) voice communication system includes an ACC voice input/output device, an ACC wave generating/restoring device, and ACC device".

In U.S. Pat. No. 8,311,827, entitled VEHICLE CONTROL, a speech recognition interface and method is described to control a UAV. The system and method includes receiving one or more instructions issued as speech; analyzing the speech using speech recognition software to provide a sequence of words and a word confidence measure for each word so recognized; analyzing the sequence of words to identify a semantic concept corresponding to an instruction based on the analysis, and a semantic confidence level for the identified semantic concept derived at least in part with reference to the word confidence measures of the words associated with the semantic concept; providing a spoken confirmation of the semantic concept so identified based on the semantic confidence level and an indicated verbosity level, the spoken confirmation being provided with one of a speaking rate or a pitch that is increased as the indicated verbosity level decreases; and using the semantic concept so identified to provide a control input for the vehicle. The step of providing the spoken confirmation of the semantic concept comprises indicating that the instruction was not understood when the semantic confidence level is below a threshold, or the step of using the semantic concept comprises providing the control input for the vehicle when the semantic confidence level exceeds the threshold.

In US Patent Publication 2008-0065275, entitled METHOD AND SYSTEM FOR CONTROLLING MANNED AND UNMANNED AIRCRAFT USING SPEECH RECOGNITION TOOLS, a system and method is provided for controlling an aircraft with voice instructions from an air traffic controller, and transmitting a voice response to the air traffic controller. At least one response logic unit is also provided to interpret the received voice instruction from the air traffic controller, determine a response to the interpreted voice instruction, and translate the interpreted voice instruction to a command suitable for input to at least one autopilot unit. The at least one autopilot unit is provided to receive the command from the response logic unit, wherein the command is configured to guide the flight of the unmanned aircraft.

In U.S. Pat. No. 7,174,300, a dialog processing method and apparatus for uninhabited air vehicles is described. The apparatus contains a recognition unit for recognizing incoming data, an interpretation unit for interpreting the data according to a grammar and a response unit for generating an appropriate response to the incoming data. The method may utilize natural language processes and may reduce to a finite state machine. The incoming data is combined with uninhabited air vehicle state information to increase the accuracy of this interpretation. Additionally, the dialog states may be limited to customary air traffic control dialogs.

In US Patent Publication 2008/0201148, a system for dynamically generating a contextual database that is accessed by a speech recognition system which interfaces with a subassembly of a vehicle is described. The system comprises: a situation sensor that generates one or more signals indicative of the situation of the vehicle, the one or more signals including contextual data that are indicative of the position and speed of the vehicle; a spoken name generator that receives the one or more signals from the situation sensor; an electronic flight bag having a first data array, the spoken name generator dynamically accessing, interpreting, analyzing and sorting through the first data array in the electronic flight bag and selecting only the data that are relevant to a pilot with respect to the present position, movement and flight plan for the aircraft; a contextual dynamic grammars database that includes a second data array which is smaller than the first data array; and a speech recognition system that interfaces with the contextual dynamic grammars database and awaits one or more commands from a pilot or other operator of the vehicle before generating and sending one or more activation signals to the subassembly, so that upon receiving the one or more commands, the speech recognition system compares the vocabulary used in the one or more commands with data elements that are stored in the second data array in the contextual dynamic grammars database and when the speech recognition system reliably recognizes the one or more commands received from the pilot or other operator and matches them with data elements contained in the contextual dynamic grammars database, the speech recognition system processes the command by communicating the one or more activation signals to the subassembly As mentioned above, in other patent publications related to UV voice control, ASR accuracy is improved by using noise cancellation techniques or by incorporating spontaneous speech in the language model which is not dynamically adapted. Examples of such are described in EP publication 2040250 B1 and U.S. Pat. No. 7,774,202 B2. In these examples ASR appears to be employed on a "black box" basis.

SUMMARY OF THE INVENTION

The present invention provides a voice-based system and method to control an unmanned vehicle (UV) or robot, which employs state and context information of the UV or robot to constrain the voice command recognition process. Voiced interaction provides a more natural human-machine interface and reduces user training requirements and user errors in adverse environments. Also, state- and context-based modeling constrains or confines the human-machine dialogue to improve the ASR accuracy and robustness, in particular in adverse environments, and to reduce the required computational load which is an advantage for on-line and real-time applications with limited devices. Moreover, the voice-based control interface can make use of any robotic operating system for executing machine commands in, and retrieving state and context information from, the UV or robot. Accordingly, the system can easily be portable to any other UV or robot. Additionally, the system is adaptable to any ASR technology.

Finally, the present invention provides a safer way to control UVs, wherein commands that are not feasible or cannot be understood by, or do not result in a response from, the UV or robot, will be rejected by the voice-based interface.

To achieve the above purpose, the method and system retrieves present state and context variables information from the UV or robot, to generate a list of feasible commands corresponding to the present state and context variables of the UV or robot. The state and context variables information is accessed intermittently, and can be consistent with time or variable with time. The list of feasible commands is a subset of a list of all possible commands that a UV can accept and take action upon, without consideration of its present state and context variables.

In one aspect of the invention, the list of feasible commands is employed to generate a language model to generate an accepted voice command from a human voice command, employing automatic speech recognition (ASR) and the language model, where the accepted voice command consists of one of the feasible commands from the list of feasible commands. The automatic speech recognition (ASR) and the language model processes the human voice command into an untested recognized voice command, which comprises one of the feasible commands, and a confidence measure, and accepts the untested recognized voice command as the accepted voice command when the confidence measure is a high confidence score. As a result, the human voice command recognition accuracy and robustness in controlled and adverse environments is improved.

In another aspect of the invention, a language model is prepared from a list of possible commands that can result in an action that the UV or robot can execute from any current possible operating state. This language model and automatic speech recognition (ASR) generate a recognized voice command from the human voice command, which comprises one of the possible commands. The recognized voice command, consisting of one of the possible commands from the list of possible commands, is accepted as the accepted voice command when the recognized voice command is also one of the feasible commands of the list of feasible commands. The automatic speech recognition (ASR) and the language model processes the human voice command into an untested recognized voice command, which comprises one of the possible commands, and a confidence measure, and accepts the untested recognized voice command as the recognized (possible) voice command when the confidence measure is a high confidence score. As a result, the human voice command recognition accuracy and robustness in controlled and adverse environments is improved.

Additionally, the control unit module of the system and the method identifies an action that the UV or robot will execute based on the accepted recognized voice command, and sends a machine command to the UV or robot to execute the action corresponding to the accepted voice command, and retrieves the updated information on the state and context of the UV or robot. The machine command is produced by sending the accepted recognized voice command to the control unit that runs on top of the UV or robot operating system, which in turn generates and sends the machine command to the UV or robot for execution.

The module is implemented on an operating system resident on the user's ground control station (e.g. laptop computer, smartphone, or equivalent device). Consequently, the technology can easily be ported from one UV or robot to other. Also, the voice-based control interface can be integrated to any ASR software.

The present invention includes a voice-based method for controlling an unmanned vehicle (UV) or robot, comprising the step of: (i) preparing a finite state machine (FSM) that includes (a) a set of current possible operating states of the UV or robot, (b) a set of possible actions that the UV or robot can perform from each state in the set of current possible operating states, (c) a set of resulting possible operating states of the UV or robot resulting from each possible action of the set of possible actions performed from each state in the set of current possible operating states, and (d) one or more context variables associated with the UV or robot; (ii) providing a set of system and operating rules and logic; (iii) retrieving a present state and one or more present context variables from the UV or robot; (iv) generating a list of feasible commands to which the UV or robot can respond, by employing the FSM, the present state and one or more present context variables, and the set of system and operating rules and logic; (v) acquiring a human voice command from a human user; (vi) generating an accepted voice command from the human voice command using automatic speech recognition (ASR) and a language model comprising the list of feasible commands, the accepted voice command consisting of one of the listed feasible commands; (vii) identifying an action that the UV or robot will execute based on the accepted voice command; (viii) sending a machine command to the UV or robot that effects the action that the UV will execute; and (ix) repeating steps (iii) through (ix). The step (vi) of generating the accepted voice command comprises generating an untested recognized voice command and a confidence measure, and accepting the untested recognized voice command as the accepted voice command when the confidence measure is a high confidence score.

The present invention includes a voice-based method for controlling an unmanned vehicle (UV) or robot, comprising the step of: (i) providing a list of possible commands that result in an action that the UV or robot can execute from any current possible operating state; (ii) preparing a finite state machine (FSM) that includes (a) a set of current possible operating states of the UV or robot, (b) a set of possible actions that the UV or robot can perform from each state in the set of current possible operating states, (c) a set of resulting possible operating states of the UV or robot resulting from each possible action of the set of possible actions performed from each state in the set of current possible operating states, and (d) one or more context variables associated with the UV or robot; (iii) providing a set of system and operating rules and logic; (iv) retrieving a present state and one or more present context variables from the UV or robot; (v) generating a list of feasible commands to which the UV or robot can respond, by employing the FSM, the present state and one or more present context variables, and the set of system and operating rules and logic;(vi) acquiring a human voice command from a human user; (vii) generating a recognized voice command from the human voice command using automatic speech recognition (ASR) and a language model comprising the list of possible commands, the recognized voice command consisting of one of the possible commands; (viii) accepting the recognized voice command as an accepted voice command when the recognized voice command is one of the feasible commands; (ix) identifying an action that the UV or robot will execute based on the accepted recognized voice command; (x) sending a machine command to the UV or robot that effects the action that the UV will execute; and (xi) repeating steps (iv) through (xi). The step (vii) of generating a recognized voice command comprises generating an untested recognized voice command and a confidence measure, and accepting the untested recognized voice command as the recognized voice command when the confidence measure is a high confidence score.

The present invention also includes a voice-based method for controlling an unmanned vehicle (UV) or robot, comprising the step of:(i) providing a list of possible commands that result in an action that the UV or robot can execute from any current possible operating state;(ii) preparing a finite state machine (FSM) that includes (a) a set of current possible operating states of the UV or robot, (b) a set of possible actions that the UV or robot can perform from each state in the set of current possible operating states, (c) a set of resulting possible operating states of the UV or robot resulting from each possible action of the set of possible actions performed from each state in the set of current possible operating states, and (d) one or more context variables associated with the UV or robot; (iii) providing a set of system and operating rules and logic; (iv) retrieving a present state and one or more present context variables from the UV or robot; (v) generating a list of feasible commands to which the UV or robot can respond, by employing the FSM, the present state and one or more present context variables, and the set of system and operating rules and logic; (vi) acquiring a human voice command from a human user; (vii) generating an accepted voice command that consists of one of the listed feasible commands, comprising at least one of: (a) generating an accepted voice command from the human voice command using automatic speech recognition (ASR) and a language model comprising the list of feasible commands, the accepted voice command consisting of one of the listed feasible commands; and (b) (i) generating a recognized voice command from the human voice command using automatic speech recognition (ASR) and a language model comprising the list of possible commands, the recognized voice command consisting of one of the possible commands, and (ii) accepting the recognized voice command as an accepted voice command when the recognized voice command is one of the feasible commands; (viii) identifying an action that the UV or robot will execute based on the accepted recognized voice command; (ix) sending a machine command to the UV or robot that effects the action that the UV will execute; and (x) repeating steps (iv) through (x).

The step (vii.a) of generating the accepted voice command comprises generating an untested recognized voice command and a confidence measure, and accepting the untested recognized voice command as the accepted voice command when the confidence measure is a high confidence score.

The step (vii.b.i) of generating a recognized voice command comprises generating an untested recognized voice command and a confidence measure, and accepting the untested recognized voice command as the recognized voice command when the confidence measure is a high confidence score.

DETAILED DESCRIPTION OF THE INVENTION

Figure 1:
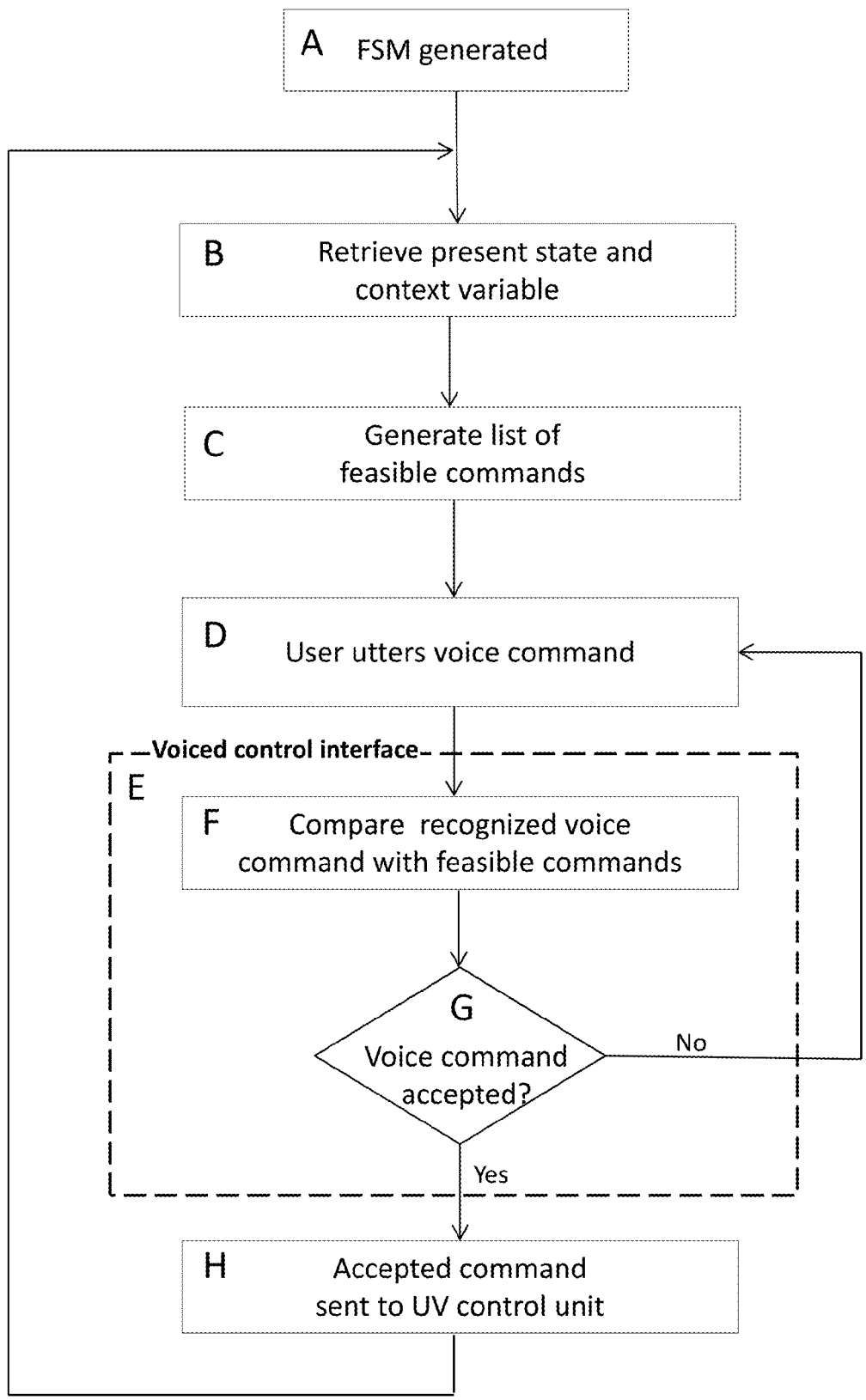
FIG. 1 shows a flow chart of a method and a system of the present invention.

The human voice based method of the present invention to control a UV or robot is suitable for situations where low or no human operator training requirements are needed or exist, where human voice commands with a high level of abstraction are used, or where high accuracy is needed in adverse environments.

The term "UV" as used herein, refers to any unmanned vehicle in general that is controlled with the method or system of the present invention.

The term "robot" as used herein, refers to any machine or mechanical device in general that operates automatically, and that is controlled with the method or system of the present invention.

The term "state" as used herein, refers to condition in which an unmanned vehicle or robot may be, or an action that an unmanned vehicle or robot may be performing, at a specific moment. This action can include, without limitation, "landed", "moving" or "flying", "rotating" or "hovering", and others.

The term "context variable" as used herein, refers to any available, detectable, and relevant information or attribute about the circumstances, objects, or conditions surrounding the unmanned vehicle or robot at a specific time. This information can include, but is not limited to, speed, altitude, temperature, the presence of obstacles, and others.

The term "automatic speech recognition" or "ASR" as used herein, refers to the computer-driven transcription of spoken language into readable text in real time. ASR is the technology that allows a computer to identify the words that a person speaks into a microphone or telephone and convert it to written text. Acoustic modeling and language modeling are important parts of modern statistically-based speech recognition algorithms. Acoustic modeling usually refers to the process of establishing statistical representations for the feature vector sequences computed from the speech signal. Hidden Markov Model (HMM) is one most common type of acoustic models. Language model gives the probabilities of sequences of words. A particular type of language model is regular grammar, which is used typically in telephony interactive voice response (IVR) applications.

The term "adverse environment" as used herein, refers to acoustic operating conditions surrounding or in the environment of the user that may be different from the controlled conditions present during ASR training Here "adverse environment" refers to an environment of high levels of acoustic noise, low quality microphones, or Lombard stressed speech.

The term "inertial measurement unit" as used herein, refers to a self-contained system that measures linear and angular motion, usually with a triad of gyroscopes and triad of accelerometers.

The term "system and operating rules and logic" as used herein, refers to rules to assess the validity of command arguments. For instance, if an UV is flying at an altitude of five meters, the command "descend to 'argument' is allowed when 'argument' is equal or lower than five meters. Another example is the sensor resolution. In the same UV example, the "rotate right 'argument' is feasible if 'argument' is specified according to the precision of the inertial measurement unit. For example, if the UV or robot inertial measurement unit, in combination with other sensors, provide a resolution equal to 10°, the command "rotate right 1°" is not considered as a feasible command.

The term "UV or robot operating system" as used herein, refers to the software that provides APIs (Application Program Interfaces) that can be called by a process to access the built-in functions implemented within the UV or robot to execute a given action.

The term "on-line" means electronic communication that processes sufficiently rapidly and with any delay that is normally not noticeable by the user.

The proposed method and system makes use of present state and context variables information of the UV or robot to build a list of all feasible commands that can execute, given the present state and context variables of the UV or robot. This list is used to decide whether the voice command given by the user is feasible and accepted, or not.

A process of the present invention is schematically illustrated in FIG. 1. The vehicle operation is modeled by employing a finite state machine (FSM) (block A). The FSM represents and synthesizes one or more possible, and including all possible, operating states in which the UV or robot can be, and one or more possible, and including all possible, actions that the vehicle can perform given a possible operating state, and the resulting state transitions resulting from a given action implemented from the possible operating state. The operating state can be, without limitation, any condition or action that the UV or robot is capable of. For example, for a UV, the operating state can be "landed", "moving", "hovering" and "rotating", without limitation. The possible actions can be static, for example, "landed" or "hovering", or can be transient, for example, "rotating" or "moving". The completion or progressing of a possible action ends in a resulting operating state for the UV.

The FSM is used in combination with the state and context information of the UV or robot (FIG. 1, block B), as well as the system and operating rules and logic. The feasible commands that result in an action that the UV is capable of performing are finite, and are dependent in part upon the current operating state and context variables. The FSM and the context and state information of the UV or robot are employed to generate a list of one or more feasible, including all feasible, voice commands to which the UV or robot will respond (FIG. 1, block C). After a voice command uttered by the user and acquired by the system (FIG. 1, block D) and recognized using ASR in the voiced control interface (FIG. 1, block E), the generated feasible command list (FIG. 1, sub-block F) is compared with the recognized voice command uttered by the user, to determine that the recognized voice command is a feasible command, and thus acceptable and capable of action by the UV (FIG. 1, sub-block G). The accepted voice command is sent to the control unit that runs on top of the UV or robot operating system (FIG. 1, block H), which in turn sends the machine command to the UV or robot for execution. If the voice command is rejected (not accepted), the user is prompted to input a different or valid voice command (into block D).

Figure 2:
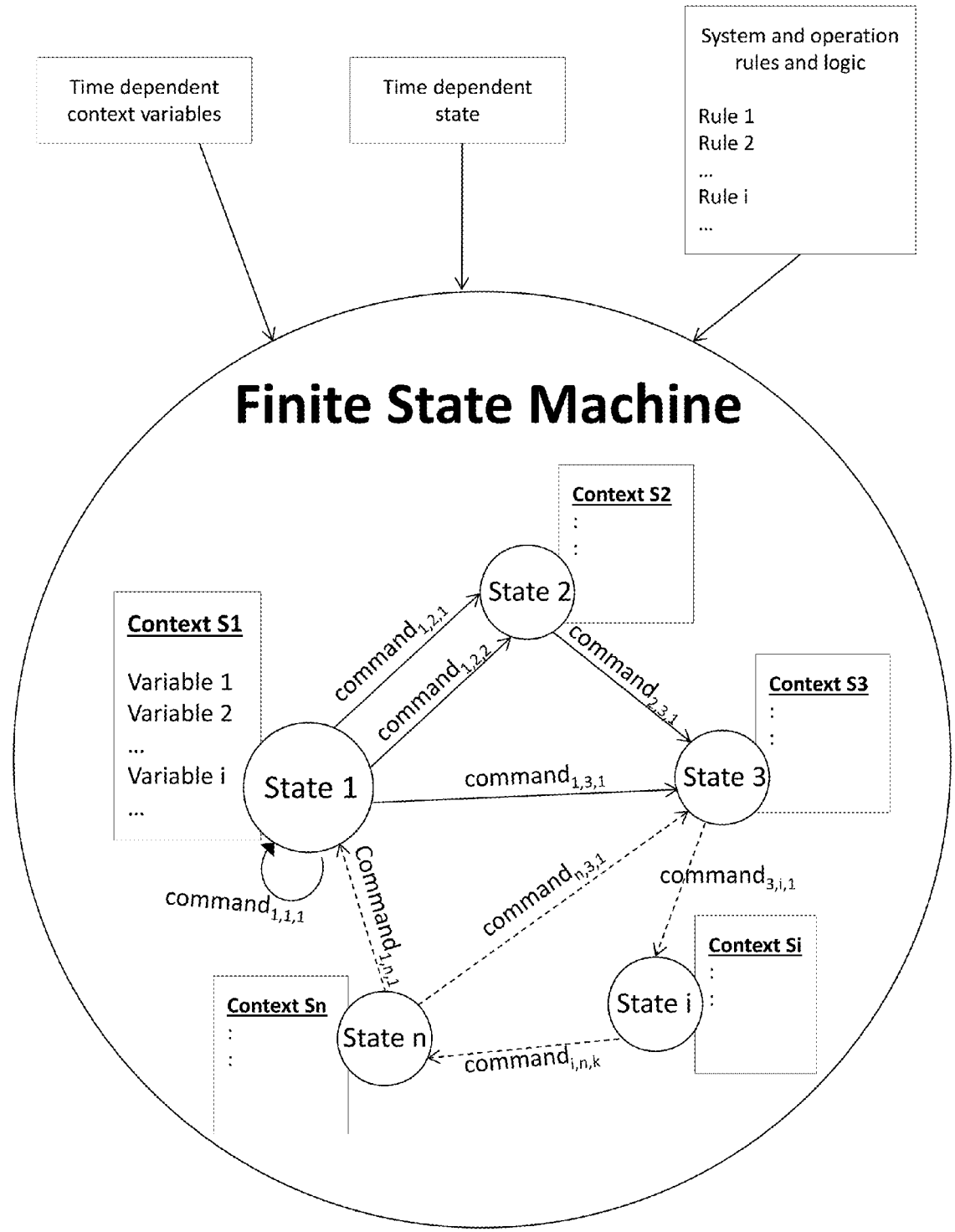
FIG. 2 illustrates the generation of a suitable commands list for a finite state machine (FSM) according to the time-dependent state and context variables of a UV or robot, and the system and operation rules and logic.

The FSM topology is illustrated in FIG. 2, as a non-limiting example. States 1, 2, 3, . . . i, . . . , n, represents a plurality of different operating states numbering n, including all the different operating states, in which a UV or robot can be. Each operating state, for example, State i, is described and characterized by a set of present context variables, for example, Context set and can be associated with a set of possible commands (generally denoted as, "$command_{i,j,k}$") representing actions that the UV or robot can execute to transit from a present operating state (State i) to new operating state (State j). Another possible command is for the UV to remain in its present operating state, for example "$command_{1,1,1}$". State transitions take place when a command is executed on the UV or robot. The command "$command_{i,j,k}$" represent the $k^{th}$ possible command producing a transition from State i to State j.

More particularly, as shown in FIG. 2, the UV is modeled to proceed from a present State 1, under context variables S1 (including variable 1, variable 2, variable i) to a new State 2, with a possible command "$command_{1,2,1}$". Or, the UV can proceed to the new State 2 with a second possible command "$command_{1,2,2}$". Alternatively, the UV in the present operating State 1 can proceed to a different new State 3 with a possible "$command_{1,3,1}$". Similarly, from a State 2, under context variables S2, the UV can transition to a new operating State 3, by executing possible "command$_{2,3,1}$". The UV can proceed to State 3 from any other State i with "command$_{i,3,1}$", or from State 3 to another State i with "command$_{3,i,1}$". And so on. The FSM herein can depend upon the particular type or style of UV or robot. States, context variables, and commands need to be defined according to the UV or robot operation.

System and operation rules and logic are defined to represent restrictions described above and discard commands that do not comply with these rules or logic, depending on the state and context information retrieved by the sensors on the UV or robot.

The current context and state information, and the system and operation rules logic are fed into the FSM. As a result, the FSM outputs a list of all the feasible commands according to the present state and context variables information of the UV or robot, and in accordance with the system and operating rules and logic.

Figures 3A, 3B:
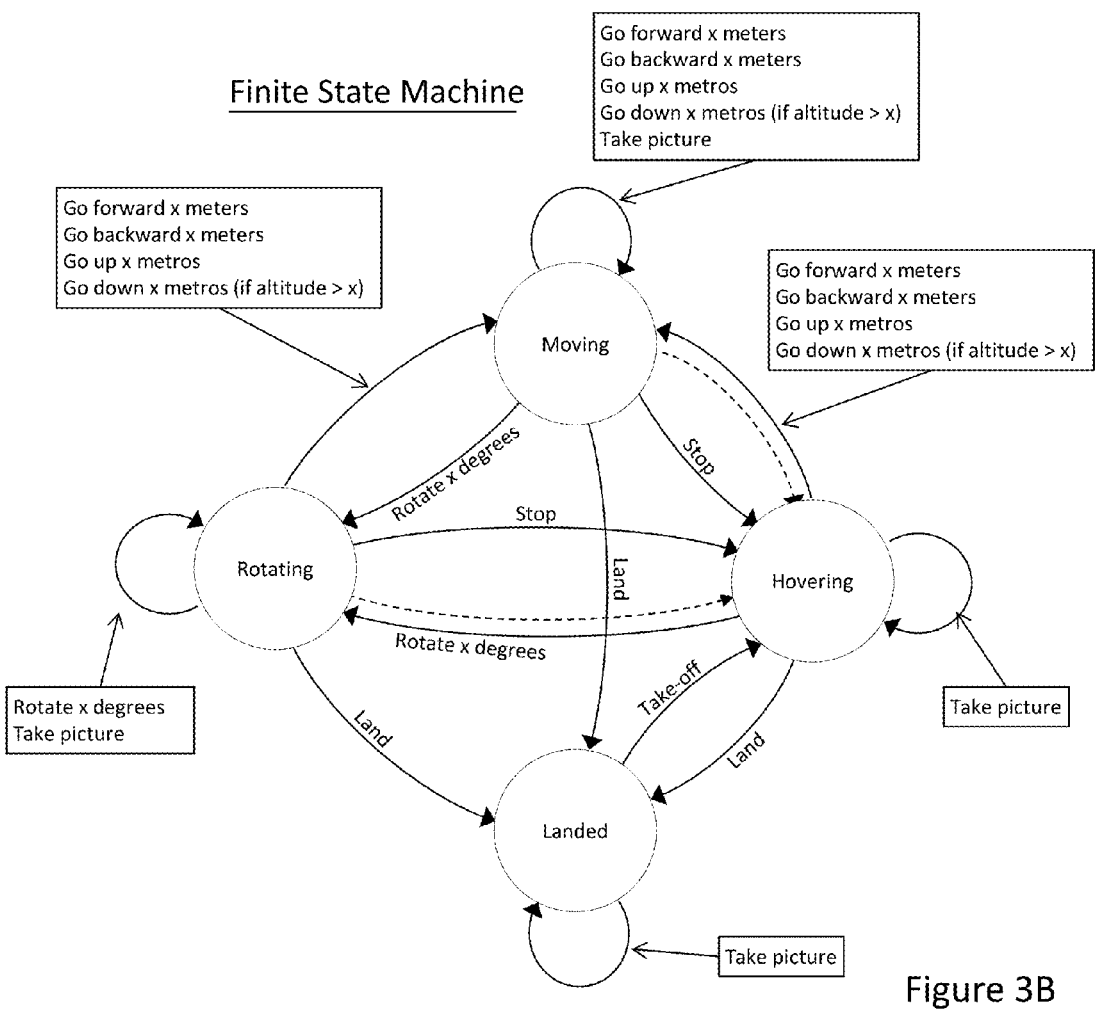
FIGS. 3A and 3B illustrate examples of context variables, and an example of the finite state machine that models the UV or robot operation.

FIGS. 3A and 3B illustrate, as a non-limiting example, typical context variables and operation states of a finite state machine modeling of the operation of a basic UV. In FIG. 3A, several different operating "states" for the UV are identified, including "moving", "hovering", "rotating" and "landed". During or in the operating state of "moving", the time-dependent context variables that are detected, measured or determined include 'position', 'altitude', 'coordinates', 'relative speed', and 'absolute speed'. During or in the operating state of "hovering", the time-dependent context variables that are detected or measured include 'position', 'altitude' and 'coordinates'. During or in the operating state of "rotating", the time-dependent context variable that is detected or measured is 'angle'. And during or in the operating state of "landed", the time-dependent context variables that are detected or measured include 'position' and 'coordinates'.

In FIG. 3B, the four states are illustrated, showing the possible state-transition commands that can be performed to proceed from one state to another state. At the bottom of FIG. 3B is the operating state of "landed". From this present state, commands can include "take a picture", which when completed, the UV remains in the present operating state of "landed". The only other command that the UV can be commanded to perform from "landed" is "take off", with the resulting new state of "hovering". From hovering, the UV can be commanded to one of two transient or active operating states: "moving" or "rotating". The commands from "hovering" to "moving" are numerous, and can include "go forward x meters", "go backward x meters", "go up x meters", and go down x meters" (which may be constrained as described later), where x can be any number according to the rules and logic of the system. After the "move" command is delivered to the UV control unit, the UV begins executing the "move" by flying (moving) in the appropriate, commanded direction, and will continue flying until arriving at the destination, determined from its present context variables (including coordinates or locations, for example) during its operating state of "moving". During the operating state of "moving" (that is, "while flying"), the command "stop" can be executed, which terminates the "move command" and returns the UV to the operating state of "hovering".

In one aspect of the invention, in accordance with the system and operating rules and logic, a new command "move" uttered during the operating state of "moving" (that is, "while flying") could be recognized and accepted, and executed. By rule or logic, the new command can be performed either after the prior "move" command has been completed, or by terminating the prior "move" command, and executing the new "move command".

In another aspect of the invention, the new command "move" uttered during the operating state of "moving is recognized but rejected.

After arriving at its destination, the UV is commanded, by rules, to return to operating state of "hovering", as shown by the dashed return line.

Likewise, the commands from "hovering" to "rotating" can be numerous, and can include "rotate x degrees". Depending on the rules and logic, the "rotating" start can be followed by a return to the hovering state, or interrupted or followed by other active commands such as a "move", "rotate" command.

From any of the other active states of "hovering", "moving" and "rotating", a command of "land" can be given. From "hovering", the UV can execute the command "land" to the new operating state of "landed". During the transient operating states of "rotating" and "moving", the execution of the command "land" will be executed depending upon the system and operation rules and logic.

This generated list of feasible commands represents one or more of, including all, the control commands that are feasible to be executed by the UV or robot. If a command is not contained in that list, it is either impossible to be completed, or undefinable, by the UV or robot. This list is employed to decide if a user voice command inputted to the system can be executed successfully or not.

A further aspect of the invention includes deleting or suppressing a command from a list of feasible or possible operating states or actions, if desired, even if the UV is capable of being in the operating state or taking the commanded action. In a non-limiting example, the list of possible states or resulting states, or actions, can be constructed to not include or to remove "take a picture", even though the UV has an image capturing device. The decision by the developer can depend on many various factors, including the complexity of the anticipated utilization and operation of the UV, the complexity of the operation, the skill and experience of the user, and the functional capability of the UV.

Voice Command Input

The human user utters a voice command into a microphone. The microphone first converts the acoustic signal of the uttered words into an analog electrical signal. An analog to digital (A/D) converter converts the analog electrical signal into a digital representation of the successive amplitudes of the audio signal created by the utterance. The recorded sound can then be stored in memory and passed to the ASR engine. The ASR engine delivers the recognized text string corresponding to the voice command uttered by the user. The ASR engine makes use of an acoustic-phonetic model and a language model. This invention proposes two methods to decide on the feasibility of the voice command input by the user.

In noisy conditions and environments, where the microphone that is detecting ("picking up", capturing) the uttered human voice command is also detecting the noise of the surrounding environment, the ASR accuracy tends to be reduced and recognition errors A misrecognized command will tend to be rejected because it shows a low confidence score, because it is not contained in the list of feasible commands or the list of possible commands. The present invention provides a pair of methods for improving the ASR accuracy and robustness.

ASR Language Model and Confidence Estimation

In a first method according to the present invention, a list of possible voice commands given the present operating state and present context variables of the UV or robot, is used to generate an ASR language model to recognize a user voice command. This ASR language model is operating state and context dependent, and hence it is time dependent, leading to reduction in the number of possible feasible commands, and hence, reduction in the vocabulary size and language model perplexity, and any particular time that a command is uttered. For example, according to FIGS. 3A and 3B, when a UV begins a "moving" action from an initial operating state of "hovering", the UV can respond to the commands of "stop", "land", and "rotate" during the time while moving. In one aspect of the invention and of this example, once the UV arrives at its commanded destination, for example, after a command "move 10 meters forward", the UV then can respond to a new voice command of "land", "rotate", and (again) "move". It is important to note that the UV or robot can also include intrinsic context information, including its own orientation, such as its front, back, upper, lower, right and left sides, such that the command "move forward 10 meters" commands the UV to move in the direction of its forward orientation. This is contrasted with extrinsic context information that the UV or robot is capable of detecting by using a sensor, which can include geographic direction, such as "east", "west", etc., or global positioning information, including but not limited to latitude and longitude.

The advantage of this procedure is that the ASR accuracy and robustness is directly improved by reducing the vocabulary size and the language model perplexity (as described in Chen, Beeferman and Rosenfeld, 2008, the disclosures of which are incorporated by reference). Accuracy can be represented as the percentage of correctly recognized words, WAC (word accuracy), or the percentage of misrecognized words, WER (word error rate). On the other hand, robustness is measured as degradation of WAC or increase of WER where testing and training acoustic conditions are different, as is well known to those skilled in the field of speech technology. Also, the reduction in the vocabulary size and in the language model perplexity leads to a reduction in the required computational load, which is an advantage for on-line applications with devices with limited computational power and memory.

The language model can also include words, or phrases, or other utterances that are not commands, that may be uttered by a user at the same time that a valid command is uttered. For example, the user may utter "uh", or "let's see", or "well then", or others. These words or phrases, or other utterances, are non-commands, but may be uttered about the same time that a command is uttered, and will be acquired and converted to a digital signal along with the valid command term or phrase. Including such non-command terms, phrases and utterances in the language model provides a more natural human-machine interface.

Figure 4A:
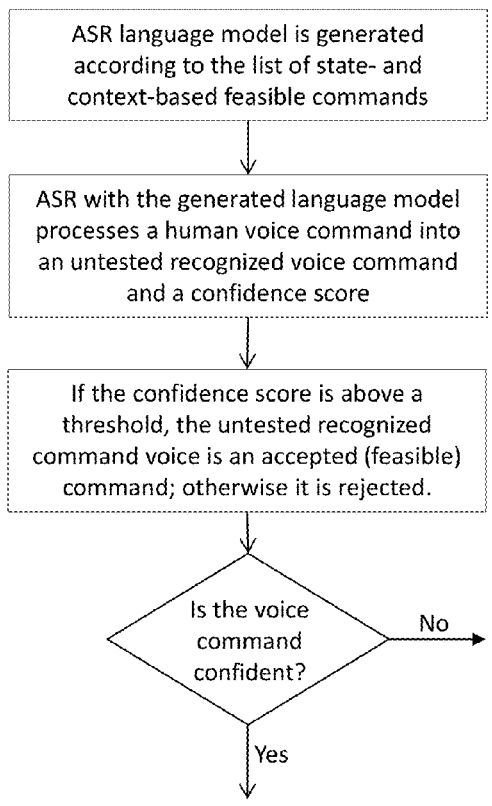
FIGS. 4A and 4B illustrate two methods or modes for human voice command recognition and filtering.
Figure 5A:
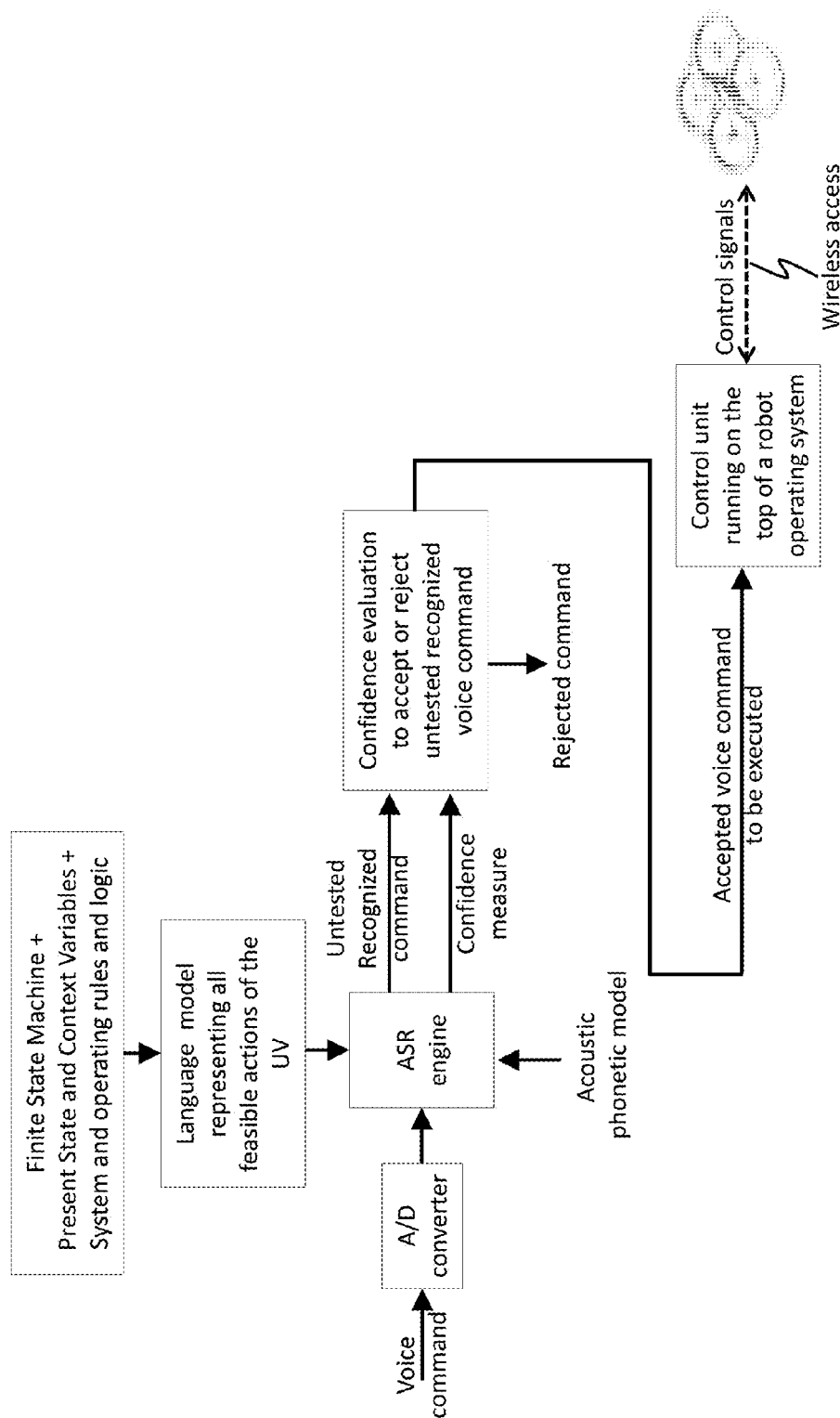
FIGS. 5A and 5B illustrate details of the two methods illustrated in FIGS. 4A and 4B, respectively.

If the operator inputs a voice command that is feasible given the present state and context variables of the UV or robot, this command is more likely to be recognized correctly with a high confidence score. If the voice command is misrecognized in an adverse environment, the ASR outputs a low confidence score. If the user inputs a voice command that is not contained in the generated list, i.e. a "not feasible" command given the current robot state and context, the speech recognition process will result in a decoded command with a low confidence measure or score. This confidence measure or score can be employed to decide if the recognized command should be accepted or not. This procedure is shown and described in FIG. 4A. A threshold is defined so the recognized command is accepted only if its resulting confidence measure or score is higher than the threshold. If the confidence score is lower than the threshold, the recognized voiced command is rejected as not feasible or possible. FIG. 5A shows the complete system operation in this mode.

Posterior Filtering Recognized Command

Figure 4B:
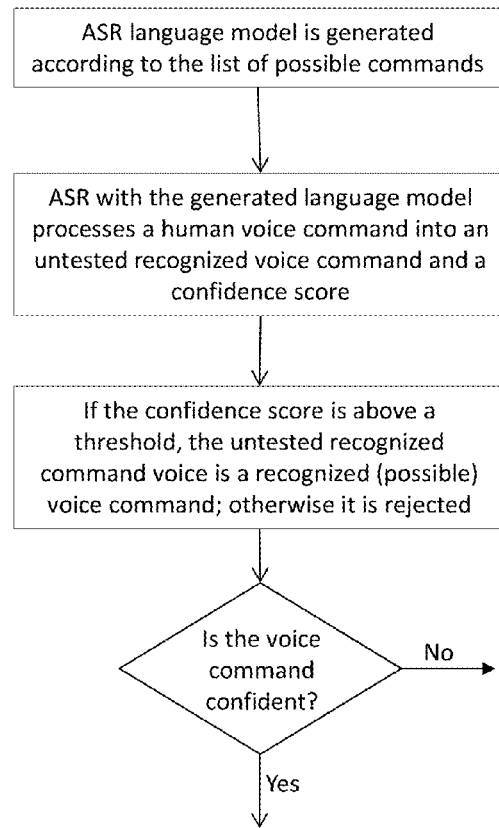
Figure 5B:
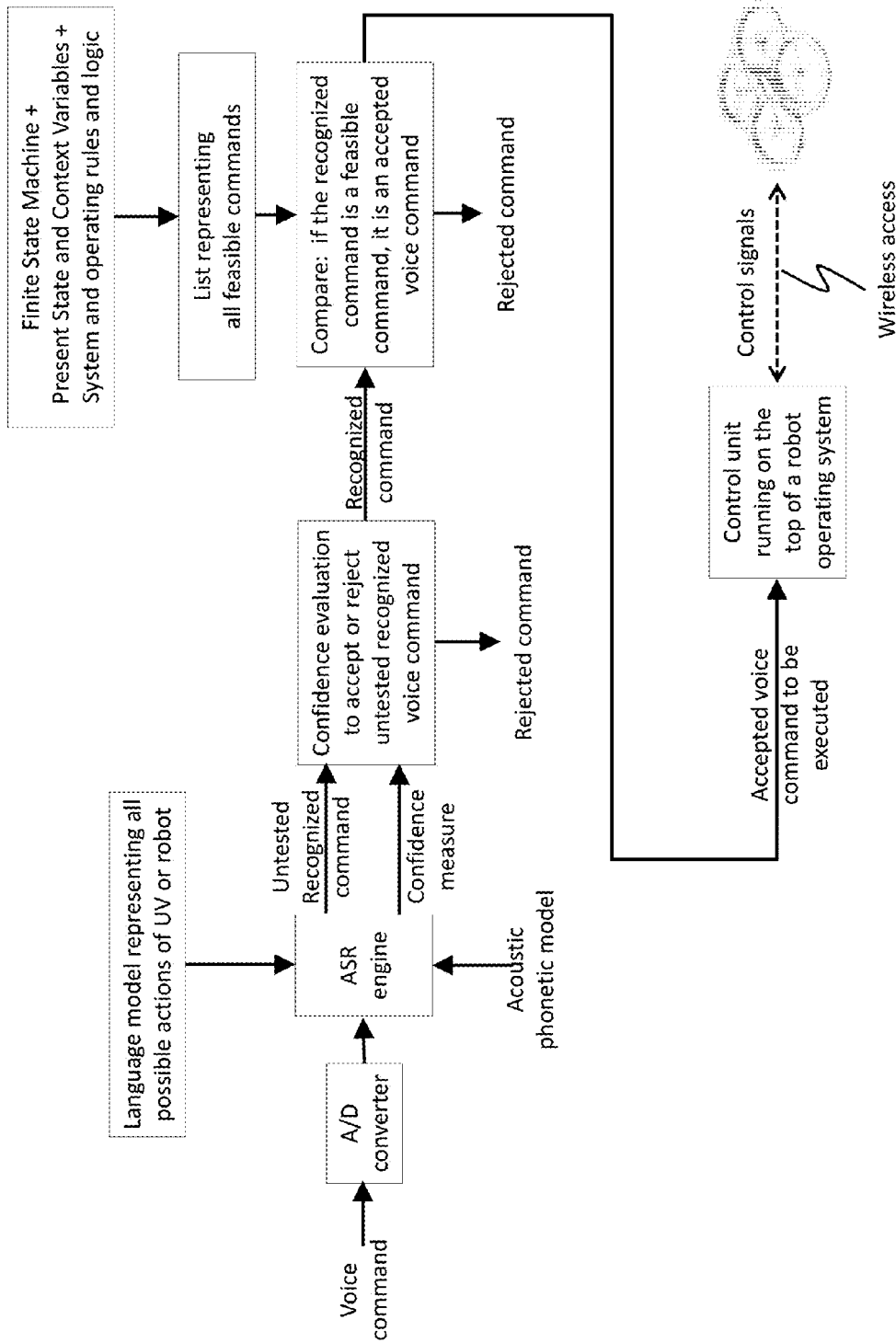

In a second method according to the present invention, the list of feasible commands, constrained by present state and context variables, is employed to filter the recognized user voice command generated by the ASR. By doing so, not feasible or unexpected commands delivered by the ASR module are discarded. In this mode, the user voice command is recognized by an ASR using a language model representing possible, including all possible, commands that result in an action that the UV or robot could execute, regardless of the present state and context variables of the UV (or robot). As in the previous method, confidence measure is employed to discard the untested recognized voice command because the current method assumes that the user voice command was misrecognized. A threshold is defined to accept or reject the ASR output. After the untested recognized voice command is accepted as the recognized voice command based on confidence measure, its feasibility is determined by comparing the recognized voice command with the generated list of feasible commands. This procedure is illustrated in FIG. 4B. If the recognized voice command, consisting of one of the list of possible voice commands, is contained in the feasible command list, the command is accepted; otherwise it is rejected. This mode can give feed-back to the user about the UV or robot state or context variable that resulted in the recognized voice command being rejected. Also, the overall result of this scheme is to improve the accuracy and robustness of the voice based human-machine interface. FIG. 5B shows the complete system operation in this mode.

In this mode as well, the language model can also include non-command words, or phrases, or other utterances, that may be uttered by a user at the same time that a valid command is uttered, to provide a more natural human-machine interface.

Sending Recognized Commands to the Robot

Figure 6:
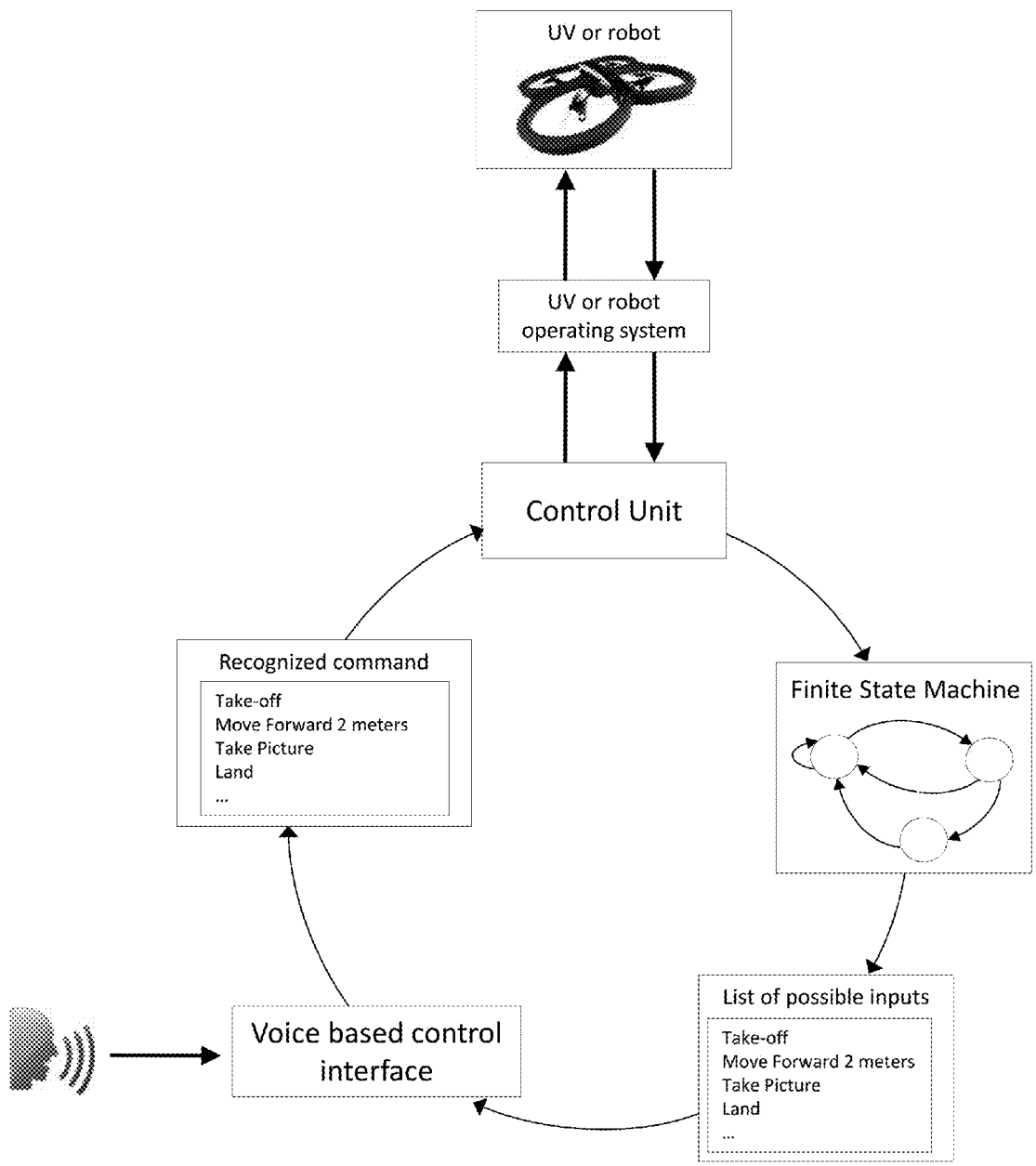
FIG. 6 illustrates the cyclic operation of the method of the present invention.

After a voiced command has been recognized and accepted as a valid command, a machine command is sent to the UV or robot. After the machine command execution, the UV or robot sends back the resulting present state and context variable information. The control unit (see FIGS. 5A and 5B), which runs on top of a robot operating system (for example, ROS and others, and equivalents), is responsible for both processes, as explained as follows, and shown in FIG. 6:

a) The recognized machine command is analyzed by the control unit and identifies the action that needs to be executed by the UV or robot.

b) The control unit sends the data representing the accepted voice command to the UV or robot by making use of the UV or robot operating system.

c) The UV or robot operating system generates and sends a machine control signal according to the UV or robot built-in set of commands. These built-in set of commands are executed according to the UV or robot internal control mechanism which is responsible for achieving the command goal.

d) After the command action is completed by the UV or robot, the control unit retrieves the information from the operating system of the UV or robot about the resulting state and context variables, by reading relevant UV or robot state and context information. The UV or robot operating system is in charge of interacting with the UV or robot sensors.

e) The updated state and context information is fed into the finite state machine in order to generate an updated list of feasible commands by making use of system and operating rules and logic, closing the loop, as is shown in FIG. 6.

EXAMPLES

Example 1

UV Operation Employing ASR Language Model and Confidence Estimation

Consider a landed UV to be controlled by a human user by means of voice commands using the method presented in this invention. When the UV is powered or turned on, the control unit retrieves the information from the operating system of the UV or robot about the current state and context. The current state of the UV is "landed", and the context of the UV includes "altitude=0 m" (above the ground or the surface on which it is landed), "horizontal speed=0 m/sec", "vertical speed=0 m/sec", and "temperature=23° C.", and others. This state and context variables information is fed into the FSM in order to generate a list of feasible commands by making use of system and operating rules and logic that can be performed by the UV in its present operating state and context variables, which list is used to generate an ASR language model that represents one or more feasible actions that the UV can execute given the present state and context variables of the UV.

While in the current operating state of "landed", the UV can perform one of the possible actions associated with that operating state, which are "take a picture" or "take-off". Therefore, the list of feasible commands that is used to either accept or reject a voice command by a user, contains the commands "take a picture" and "take-off". If the user utters the voice command "take a picture" into the microphone when the UV is landed, the voice command is recognized by the ASR module, and matched as a command with one of the two feasible machine commands, "take a picture", with a high confidence measure, according to the first method described above. The UV is commanded to take the action "take a picture", which results in a picture image being generated. The resulting state of the UV remains "landed".

If the user utters the voice command "take-off" into the microphone when the UV is landed, the voice command is recognized by the ASR module, and matched as a command with the other of the two feasible machine commands, "take off". The UV is commanded to take the action "take off", which results in the UV raising a short distance just off the ground. The resulting state of the UV becomes "hovering", according to the first method described above.

On the other hand, if the user utters the voice command "move forward 5 meters" into the microphone when the UV is landed, the ASR outputs a recognized voice command with low confidence measure, the voice command is determined not to be a match with a feasible command or action resulting therefrom, and the voice command is ignored or rejected with a low confidence, and the UV remains "landed".

Example 2

System and Operating Rules and Logic

The resolution of an inertial measurement unit of a UV, in combination with other sensors, can place an intrinsic resolution limitation on the recognized voice command. For example, the "rotate right 'argument'" command may be feasible if 'argument' is specified according to the precision of the inertial measurement unit. In this example, the inertial measurement unit and sensors of the UV provide a resolution equal to 10° for rotational movements, and 0.5 meters for horizontal (forward, backward, right and left) and vertical (up and down) movements. The feasible list of all rotational and movement commands is then constrained to: "rotate left 10°", "rotate left 20°", "rotate left 30°", . . . , "rotate right 10°", "rotate right 20°, "rotate right 30°", . . . , "go forward 0.5 meters", "go forward 1.0 meters", "go forward 1.5 meters", . . . , "go backward 0.5 meters", "go backward 1.0 meters", "go backward 1.5 meters", . . . , "go up 0.5 meters", go up 1.0 meters", . . . , "go down 0.5 meters", "go down 1.0 meters", etc. Also, if the UV is hovering at an altitude of five meters, the command "descend 'argument' meters" is allowed when 'argument' is equal or lower than five meters. In another aspect of the example, if the UV is moving horizontally at an altitude of five meters, the command "descend 'argument' meters" is allowed when 'argument' is equal or lower than five meters.

Example 3

ASR Language Model and Confidence Score

In a method and system of recognizing feasible commands, a language model is prepared to represent one or more feasible, including all feasible, commands that result in an action that the UV can execute from the present state of the UV. In the example above, the finite state machine employs the present state and context variables information of the UV to generate a list of feasible commands that can be performed by the UV in its current operating state, which list is used to generate an ASR language model according to the first method. When the UV is in the current operating state of "landed", the list can include "take off" and "take a picture". When the user utters "take off", the recognized voice command is matched with a feasible action with high confidence measure, according to the first method described above, and the UV is given the machine command to "take off".

Alternatively, when the UV is in the present operating state of "hovering", the list can include "land", "take a picture", "move up x meters" (and/or "rise x meters"), "move down x meters" (and/or "descend x meters"), "move forward x meters" (and/or "advance x meters"), "move backward x meters" (and/or "retreat x meters"), etc., "rotate right y degrees", "rotate left y degrees". When the user utters "take off", the ASR language model does not include this voice command, and the ASR engine outputs a recognized voice command with low confidence measure according to the first method described above. The recognized voice command is determined not to be a match with a feasible action, and the recognized voice command is ignored or rejected, and the UV remains "hovering".

Example 4

Posterior Filtering Recognized Command

In another example, a list of all possible commands that can be performed by the UV, without regard to or constrained by the current actions and context variable of the UV, is used to generate an ASR language model. The list can include "land", "take off", "take a picture", "move up x meters" (and/or "rise x meters"), "move down x meters" (and/or "descend x meters"), "move forward x meters" (and/or "advance x meters"), "move backward x meters" (and/or "retreat x meters"), etc., "rotate right y degrees", "rotate left y degrees". In the above Example 1, since the voice command "take-off" is contained in the possible command list, and hence, contained in the language model, that voice command is likely to be recognized correctly, and with a high confidence measure or score, as a recognized voice command that is, though not yet accepted. Then, the recognized voice command, consisting of one of the possible commands, will be compared with the constrained list of feasible commands that the UV can perform while in the "landed" operating state, which includes the command "take off". Thus the feasible machine command is recognized as an executable, feasible command by the UV while in the "landed" state, is accepted, and the UV executes the action, by lifting off.

While the detailed description and examples addressed an unmanned vehicle (UV), the invention fully contemplates the commanding of robots. For example, a stationary or mobile robot can include an extending appendage with a grasping hand at the end, and operating states can include, by example and without limitation, "home" (retracted to a base position and condition), "extending", "raising" and "lowering of the appendage, "grasping" and "rotating" of the hand, and, "pivoting" of the robot itself.

Following this procedure, the voice control interface is able to track the dynamics of UV or robot operating conditions.

Applicants incorporate by reference the following references in their entireties: Chen, S. F., Beeferman, D. & Rosenfeld, R. "Evaluation metrics for language models". DARPA Broadcast News Transcription and Understanding Workshop, 2008; JP Publication 2013-128287; KR Publication 101330991; KR Publication 2011-0135070; U.S. Pat. No. 8,311,827; U.S. patent application Ser. No. 11/688,045; U.S. Pat. No. 7,174,300; US Patent Publication 2008/0201148; EP Publication 2040250 B1; and U.S. Pat. No. 7,774,202.

We claim:

1. A voice-based method for controlling an unmanned vehicle (UV) or robot, comprising the step of:
   (i) preparing a finite state machine (FSM) that includes
      (a) a set of current possible operating states of the UV or robot,
      (b) a set of possible actions that the UV or robot can perform from each state in the set of current possible operating states,
      (c) a set of resulting possible operating states of the UV or robot resulting from each possible action of the set of possible actions performed from each state in the set of current possible operating states, and
      (d) one or more context variables associated with the UV or robot;
   (ii) providing a set of system and operating rules and logic;
   (iii) retrieving a present state and one or more present context variables from the UV or robot;
   (iv) generating a list of feasible commands to which the UV or robot can respond, by employing the FSM, the present state and one or more present context variables, and the set of system and operating rules and logic;
   (v) acquiring a human voice command from a human user;
   (vi) generating an accepted voice command from the human voice command using automatic speech recognition (ASR) and a language model comprising the list of feasible commands, the accepted voice command consisting of one of the listed feasible commands;
   (vii) identifying an action that the UV or robot will execute based on the accepted voice command;
   (viii) sending a machine command to the UY or robot that effects the action that the UV or robot will execute; and
   (ix) repeating steps (iii) through (ix).

2. The method of claim 1 wherein the step (vi) of generating the accepted voice command comprises generating an untested recognized voice command and a confidence measure, and accepting the untested recognized voice command as the accepted voice command when the confidence measure is a high confidence score.

3. The method according to claim 1, wherein the execution of commands in the UV or robot and the retrieval of present state and context variable information from the UV or robot is carried out by a control unit that runs on the top of a UV or robotic operating system.

4. The method according to claim 2, wherein the execution of commands in the UV or robot and the retrieval of present state and context variable information from the UV or robot is carried out by a control unit that runs on the top of a UV or robotic operating system.

5. A voice-based method for controlling an unmanned vehicle (UV) or robot, comprising the step of:
   (i) providing a list of possible commands that result in an action that the UV or robot can execute from any current possible operating state;
   (ii) preparing a finite state machine (FSM) that includes
      (a) a set of current possible operating states of the UV or robot,
      (b) a set of possible actions that the UV or robot can perform from each state in the set of current possible operating states,
      (c) a set of resulting possible operating states of the UV or robot resulting from each possible action of the set of possible actions performed from each state in the set of current possible operating states, and
      (d) one or more context variables associated with the UV or robot;
   (iii) providing a set of system and operating rules and logic;
   (iv) retrieving a present state and one or more present context variables from the UV or robot;
   (v) generating a list of feasible commands to which the UV or robot can respond, by employing the FSM, the present state and one or more present context variables, and the set of system and operating rules and logic;
   (vi) acquiring a human voice command from a human user;
   (vii) generating a recognized voice command from the human voice command using automatic speech recognition (ASR) and a language model comprising the list of possible commands, the recognized voice command consisting of one of the possible commands;
   (viii) accepting the recognized voice command as an accepted voice command when the recognized voice command is one of the feasible commands;
   (ix) identifying an action that the UV or robot will execute based on the accepted recognized voice command;
   (x) sending a machine command to the UV or robot that effects the action that the UV or robot will execute; and
   (xi) repeating steps (iv) through (xi).

6. The method according to claim 5 wherein the step (vii) of generating a recognized voice command comprises generating an untested recognized voice command and a confidence measure, and accepting the untested recognized voice command as the recognized voice command when the confidence measure is a high confidence score.

7. The method according to claim 5, wherein a human voice command inputted by a user is filtered using a restricted language model that represents a set of possible commands that result in an action that the UV or robot can perform.

8. The method according to claim 6, wherein the execution of commands in the UV or robot and the retrieval of present state and context variable information from the UV or robot is carried out by a control unit that runs on the top of a UV or robotic operating system.

9. The method according to claim 7, wherein the execution of commands in the UV or robot and the retrieval of present state and context variable information from the UV or robot is carried out by a control unit that runs on the top of a UV or robotic operating system.

10. A voice-based method for controlling an unmanned vehicle (UV) or robot, comprising the step of:
   (i) providing a list of possible commands that result in an action that the UV or robot can execute from any current possible operating state;
   (ii) preparing a finite state machine (FSM) that includes
      (a) a set of current possible operating states of the UV or robot,
      (b) a set of possible actions that the UV or robot can perform from each state in the set of current possible operating states,
      (c) a set of resulting possible operating states of the UV or robot resulting from each possible action of the set of possible actions performed from each state in the set of current possible operating states, and
      (d) one or more context variables associated with the UV or robot;
   (iii) providing a set of system and operating rules and logic;
   (iv) retrieving a present state and one or more present context variables from the UV or robot;
   (v) generating a list of feasible commands to which the UV or robot can respond, by employing the FSM, the present state and one or more present context variables, and the set of system and operating rules and logic;
   (vi) acquiring a human voice command from a human user;
   (vii) generating an accepted voice command that consists of one of the listed feasible commands, comprising at least one of:
      (a) generating an accepted voice command from the human voice command using automatic speech recognition (ASR) and a language model comprising the list of feasible commands, the accepted voice command consisting of one of the listed feasible commands; and
      (b) (i) generating a recognized voice command from the human voice command using automatic speech recognition (ASR) and a language model comprising the list of possible commands, the recognized voice command consisting of one of the possible commands, and
         (ii) accepting the recognized voice command as an accepted voice command when the recognized voice command is one of the feasible commands;
   (viii) identifying an action that the UV or robot will execute based on the accepted recognized voice command;
   (ix) sending a machine command to the UV or robot that effects the action that the UV or robot will execute; and
   (x) repeating steps (iv) through (x).

11. The method of claim 10 wherein the step (vii.a) of generating the accepted voice command comprises generating an untested recognized voice command and a confidence measure, and accepting the untested recognized voice command as the accepted voice command when the confidence measure is a high confidence score.

12. The method according to claim 10 wherein the step (vii.b.i) of generating a recognized voice command comprises generating an untested recognized voice command and a confidence measure, and accepting the untested recognized voice command as the recognized voice command when the confidence measure is a high confidence score.

13. The method according to claim 11, wherein the execution of commands in the UV or robot and the retrieval of present state and context variable information from the UV or robot is carried out by a control unit that runs on the top of a UV or robotic operating system.

14. The method according to claim 12, wherein the execution of commands in the UV or robot and the retrieval of present state and context variable information from the UV or robot is carried out by a control unit that runs on the top of a UV or robotic operating system.

* * * * *